United States Patent
Porcs

(10) Patent No.: US 8,616,608 B1
(45) Date of Patent: Dec. 31, 2013

(54) TWO-PIECE ASSEMBLY FOR A WRAPPED PANEL HAVING A HOLE OR UNIQUE FEATURE

(71) Applicant: Toyota Motor Engineering & Manufacturing North America, Inc., Erlanger, KY (US)

(72) Inventor: Robert Anthony Porcs, Waterford, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/645,945

(22) Filed: Oct. 5, 2012

(51) Int. Cl.
  *B62D 25/14* (2006.01)
(52) U.S. Cl.
  USPC .............................. 296/70; 296/1.08; 296/191
(58) Field of Classification Search
  USPC .................................. 296/70, 1.08, 191, 39.1
  See application file for complete search history.

(56) References Cited

U.S. PATENT DOCUMENTS

| | | | |
|---|---|---|---|
| 4,560,186 A | 12/1985 | Onitsuka et al. | |
| 6,017,054 A | 1/2000 | Magoteaux | |
| 6,308,488 B1 * | 10/2001 | Hoshino | 52/716.5 |
| 6,464,280 B1 | 10/2002 | Shibata et al. | |
| 7,370,719 B2 * | 5/2008 | Sakamoto | 180/90 |
| 7,374,201 B2 | 5/2008 | Chausset | |
| 7,753,423 B2 | 7/2010 | Zellner, Jr. | |
| 7,841,619 B2 | 11/2010 | Miyamoto et al. | |
| 2002/0153741 A1 * | 10/2002 | Speelman et al. | 296/70 |
| 2005/0253409 A1 * | 11/2005 | Sato et al. | 296/70 |
| 2007/0278809 A1 * | 12/2007 | Reed et al. | 296/1.08 |
| 2009/0100654 A1 | 4/2009 | Carps | |
| 2010/0171333 A1 * | 7/2010 | Smith et al. | 296/1.08 |

\* cited by examiner

*Primary Examiner* — Jason S Morrow
(74) *Attorney, Agent, or Firm* — Gifford, Krass, Sprinkle, Anderson & Citkowski, P.C.

(57) ABSTRACT

The present invention can include a panel assembly and method to make the panel assembly to be installed in an instrument panel, the panel assembly having a front panel and a side panel. The front panel and side panel can be covered with a flexible covering. The flexible covering on the front panel and the flexible covering on the side panel can be wrapped around the respective panel in a joint area where the front panel and side panel meet. A compression force in the joint area can help secure the flexible coverings. The front panel and/or the side panel can also have one or more attachment means, such as clips, fastener holes and the like for attaching the panel assembly to the instrument panel.

13 Claims, 4 Drawing Sheets

TWO-PIECE ASSEMBLY FOR A WRAPPED PANEL HAVING A HOLE OR UNIQUE FEATURE

FIELD OF THE INVENTION

The present invention relates to a panel assembly for an instrument panel of a vehicle, specifically to a panel assembly having multiple panels with unique features and a flexible covering material.

BACKGROUND OF THE INVENTION

Instrument panels and instrument panel assemblies in modern vehicles continue to get more complicated and luxurious with every new model year. These instrument panel assemblies can include features such as air vents, speaker holes, storage areas and the like. To allow installation of these features, an increased amount of holes or apertures are required to be placed in the panel members themselves. Panel assemblies are also increasing in their complexity and luxuriousness in that they are being given various surface treatments or flexible coverings, such as leather, synthetic leather, fabric, flexible plastic and the like, to increase the luxury look and feel of the panels.

As panel assemblies grow in complexity in both shape and various coverings, a problem arises in that applying the flexible covering for the panel assembly having multiple or complicated features becomes difficult. The flexible covering can be difficult to adhere in areas around the holes for the vents, speakers and such, and also difficult to adhere in joining areas between panels. In addition, the flexible covering may have visible imperfections such as wrinkles, folds, or creases arising from the complicated shapes.

As such, it can be difficult to assemble and install the instrument panel assembly having the flexible covering. In addition, this creates a need for a new panel assembly design and method for installation that provides an acceptable product that does not have wrinkles, folds, or creases in the flexible covering on the panel.

SUMMARY OF THE INVENTION

The present invention includes a panel assembly to be installed in an instrument panel, the panel assembly having a front panel and a side panel. The front panel and side panel can be made of plastic, wood, metal or any other material known to those skilled in the art. The front panel and side panel are covered with a flexible covering such as leather, cloth, synthetic leather, flexible plastic and the like. In addition, the front panel and the side panel can each have their own flexible covering.

The flexible covering on the front panel and the flexible covering on the side panel is wrapped around their respective panel and is secured in a joint area where the front panel and side panel meet. The front panel and side panel are attached to one another with at least one first attachment member that provides a compression force in the joint area to help secure the flexible coverings. The front panel and/or the side panel can also have one or more second attachment members, such as clips, fastener holes and the like for attaching the panel assembly to the instrument panel.

It is appreciated that the panel assembly of the present invention is not limited to having just the front panel and side panel. For example, additional panels such as a bottom panel, a top panel, a second front panel, a second side panel, etc. can be included. Each panel can have its own flexible covering. In addition, these panels could have multiple joint areas where the various panels meet to receive and compress the flexible coverings. It is further appreciated that not all the panels need to have the flexible covering. For example, a single panel, or just a few of the panels of the panel assembly can have the flexible covering received in the joint areas. Furthermore, the attachment means can be located on any panel of the panel assembly, and is not necessarily limited to being located on the front panel and/or the side panel.

A method of assembling the inventive panel assembly includes extending flexible coverings across the front panel and side panel, attaching the front and side panels together with the first attachment member between the front and side panels, the first attachment member providing a compression of the flexible covering between the front panel and side panel and thereby helping to secure it. After the front panel and side panels have been attached together with the flexible covering compressed therebetween, the panel assembly is installed in the instrument panel with the second attachment member located on the front panel and/or side panel.

It is appreciated that the above method can by used to assemble and install panel assemblies having more panels than just a front panel and a side panel. For example, in a panel assembly having more panels, the panels can first be covered with the flexible coverings, the panels can then be attached to each other thereby creating a panel assembly, and finally the panel assembly can be installed into the instrument panel.

DETAILED DESCRIPTION OF THE INVENTION

Figure 1:
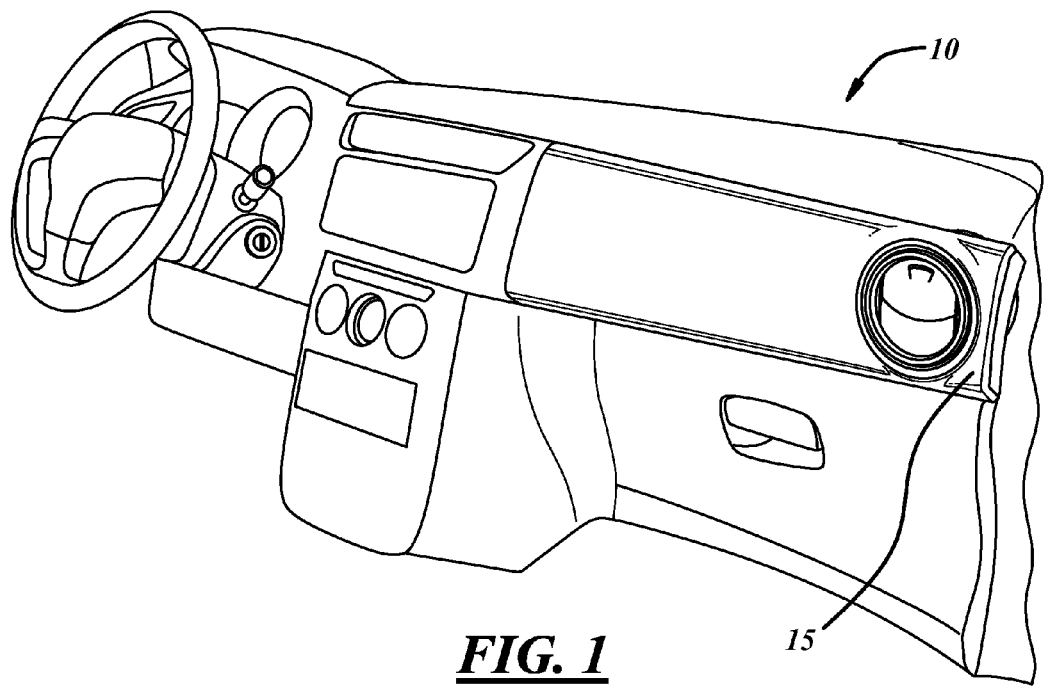
FIG. 1 is a perspective view of an instrument panel having a panel assembly of the present invention.

Turning now to the Figures, an instrument panel 10 having a panel assembly 15 of the preferred embodiment is shown in FIG. 1. The panel assembly 15 can be seen including its component parts, a front panel 20 and a side panel 25. The front panel 20 and the side panel 25 can be made of plastic, metal, wood, or any other material known to those skilled in the art.

Figure 2:
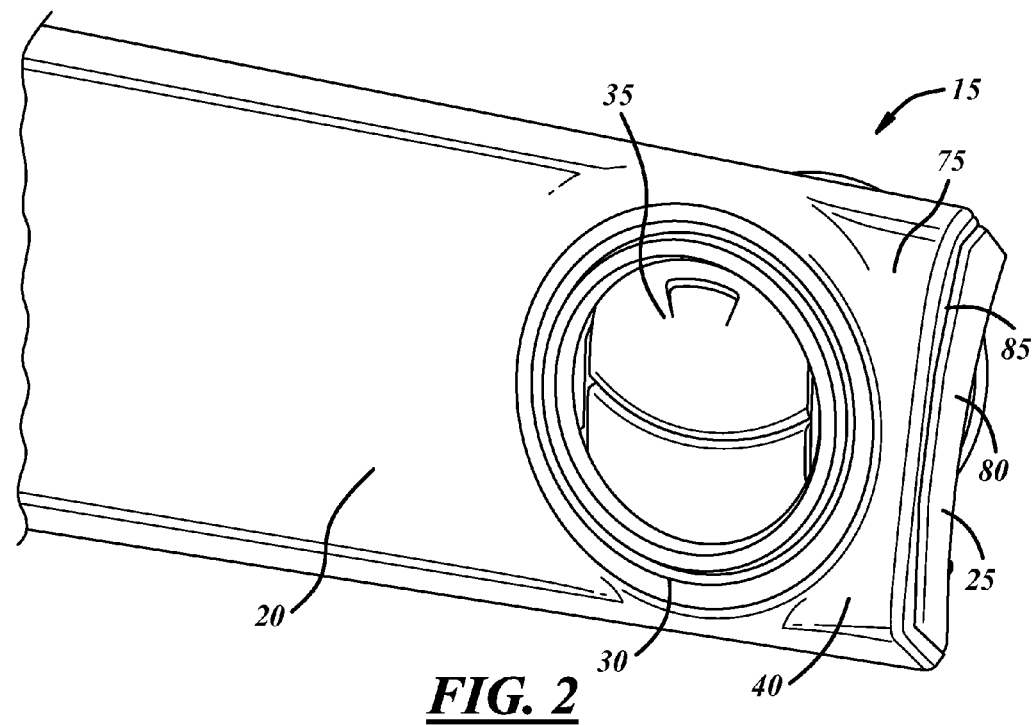
FIG. 2 is a perspective view of the front of the panel assembly shown in FIG. 1.

The front panel 20 can has a cut out portion 30 (FIG. 2) designed to house a vent 35 or other unique feature such as a speaker or storage space (not shown). The front panel 20 has a front surface 40 which faces the outside of the instrument panel 10 when the panel assembly 15 is installed. The front panel further includes an end portion which extends generally normal from a distal end of the front panel. In the preferred embodiment, the end portion is defined by lip 41 on the front panel 20.

Figure 3:
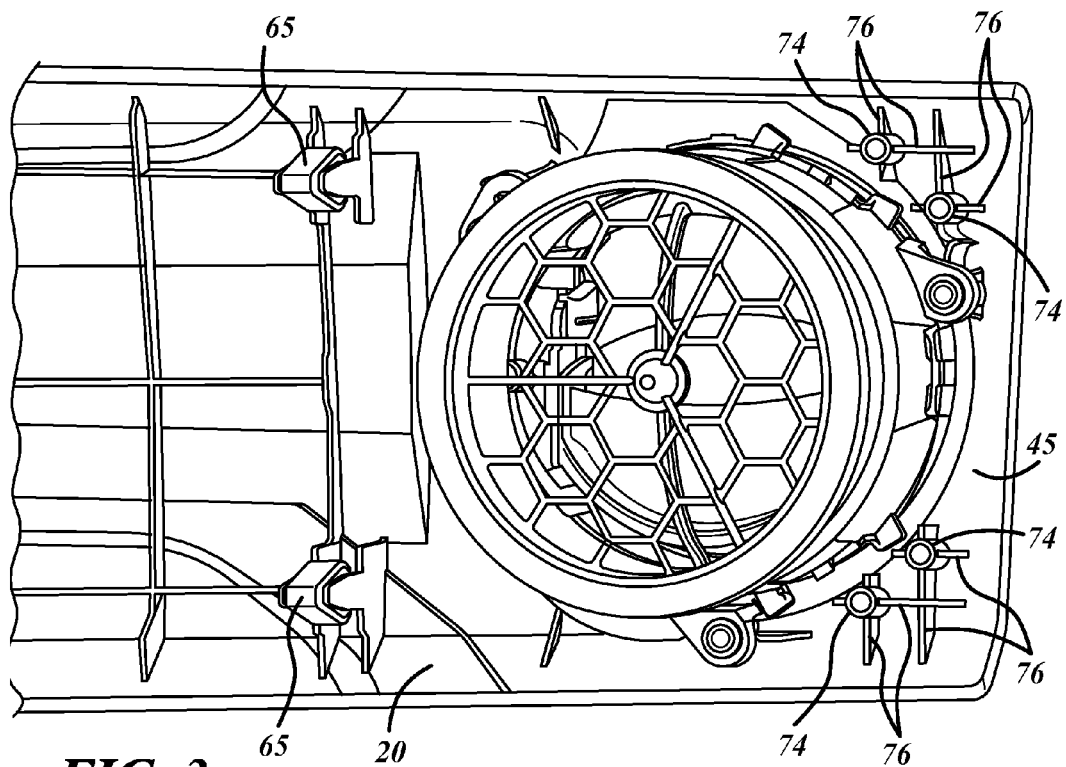
FIG. 3 is a perspective view of the back of a front panel of the panel assembly.
Figure 4:
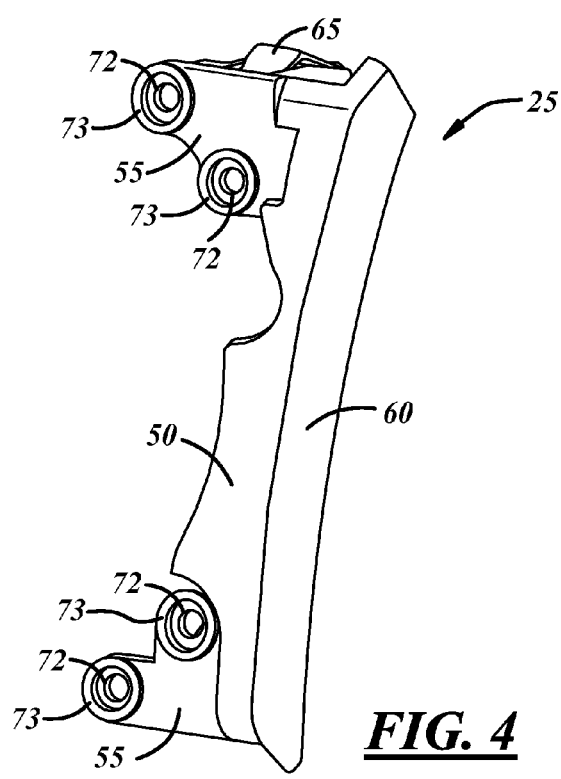
FIG. 4 is a perspective view of a side panel of the panel assembly.
Figure 5:
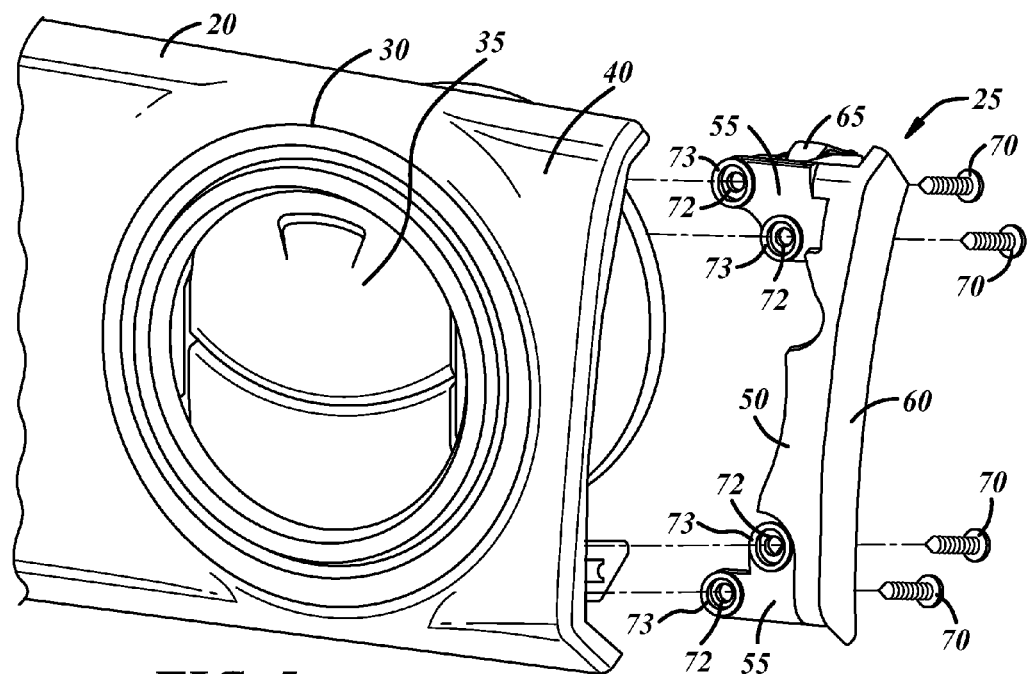
FIG. 5 is a perspective exploded front view of the panel assembly.
Figure 7:
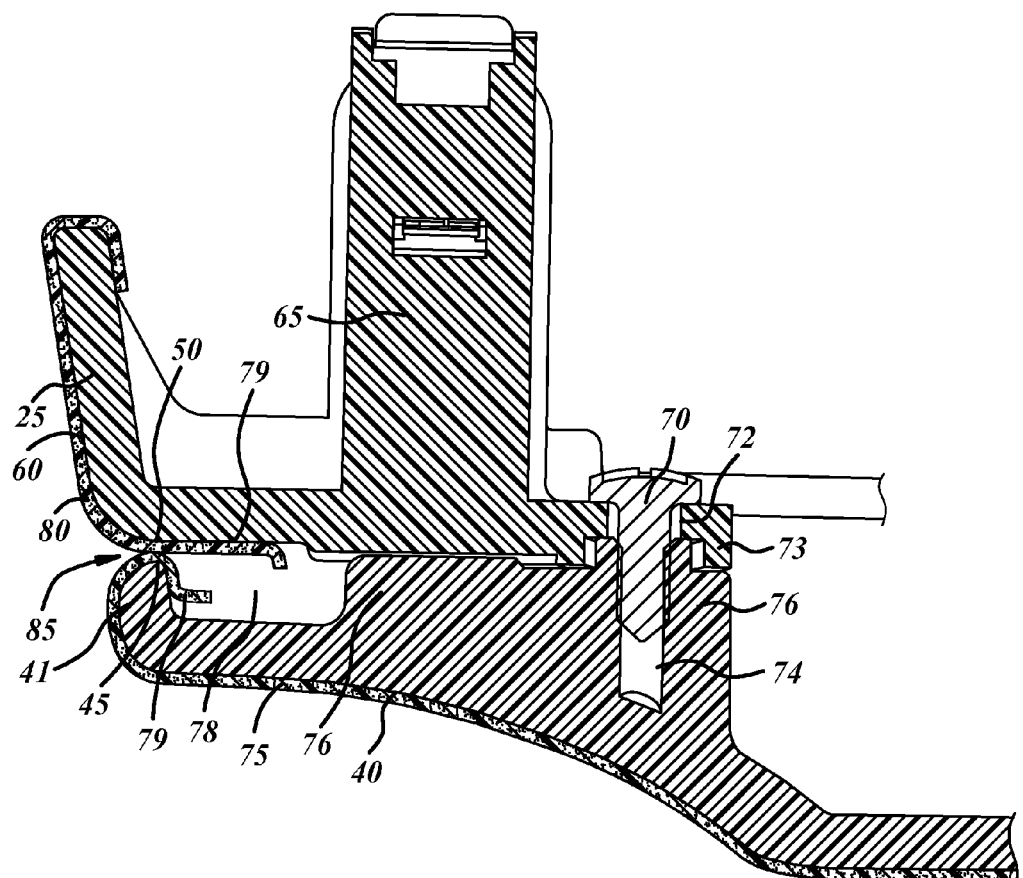
FIG. 7 is a cross-sectional view of the panel assembly label 7-7 in FIG. 6.

The front surface 40 of the front panel 20 has a first flexible covering 75 such as leather, synthetic leather, fabric, plastic and the like. The first flexible covering 75 extends across the front surface 40 and wraps around the front panel 20 to a back surface 45 (FIG. 3) of the front panel 20 in a joint area 85 between the front panel 20 and the side panel 25 (FIG. 4). The joint area 85 is formed by the end portion, or lip 41, of the front panel 20 abutting inside surface 50 of the side panel 25 (FIG. 7). The back surface 45 is a mating surface with an inside surface 50 of the side panel 25 which secures the first flexible covering 75 via a compression force as further discussed below. In some instances, the cut out portion 30 can be proximate to the joint area 85 such that wrapping the first flexible covering 75 between the cut out portion 30 and the joint area 85 is difficult. Stated differently, providing a smooth aesthetically pleasing fit of the first flexible covering 75 in the area between the cut out portion 30 and the joint area 85 can be difficult and require the inventive panel assembly and/or method disclosed herein.

The side panel 25 of the preferred embodiment has an outside surface 60 which is covered by a second flexible covering 80 that wraps around to the inside surface 50 and is received in the joint area 85 between the front panel 20 and side panel 25. The outside surface 60 is generally normal to the inside surface 50 and the front surface 40.

The side panel 25 has one or more panel assembly attachment portions 55. The panel assembly attachment portions 55 includes one or more holes 72 to receive fasteners 70 which fasten the side panel 25 to the front panel 20 as is known to those skilled in the art. The holes 72 are surrounded by a raised lip 73. The raised lip 73 helps to properly seat and align the panel assembly attachment portion 55 to the front panel 20.

The fasteners 70 are received by one or more bosses 74 in the front panel 20. The bosses 74 in the front panel 20 are given additional strength by one or more support ribs 76 which extend outward in a radial pattern from the bosses 74.

The fasteners 70 also provide a compression force in the joint area 85 between the back surface 45 of the front panel 20 and the inside surface 50 of the side panel 25 where the first flexible covering 75 of the front panel 20 and the second flexible covering 80 of the side panel 25 are received. The fasteners 70 can be a threaded screw, a clip, or any other fastener known to those skilled in the art capable of providing a compression force between the front panel 20 and the side panel 25. It is appreciated the panel assembly attachment portions 55, holes 72, bosses 74 and support ribs 76 can vary in shape and design depending on the type of fastener used to secure the front panel 20 to the side panel 25.

Between the front panel 20 secured to the side panel 25 is an excess flexible material receiving area 78. The excess flexible material receiving area 78 is located behind the joint area 85, and is designed to house end portions 79 of the first flexible covering 75 and second flexible covering 80 when the front panel 20 is secured to the side panel 25. Providing the excess flexible material receiving area 78 aids in creating the smooth aesthetically pleasing surface of the panel assembly 15.

Figure 6:
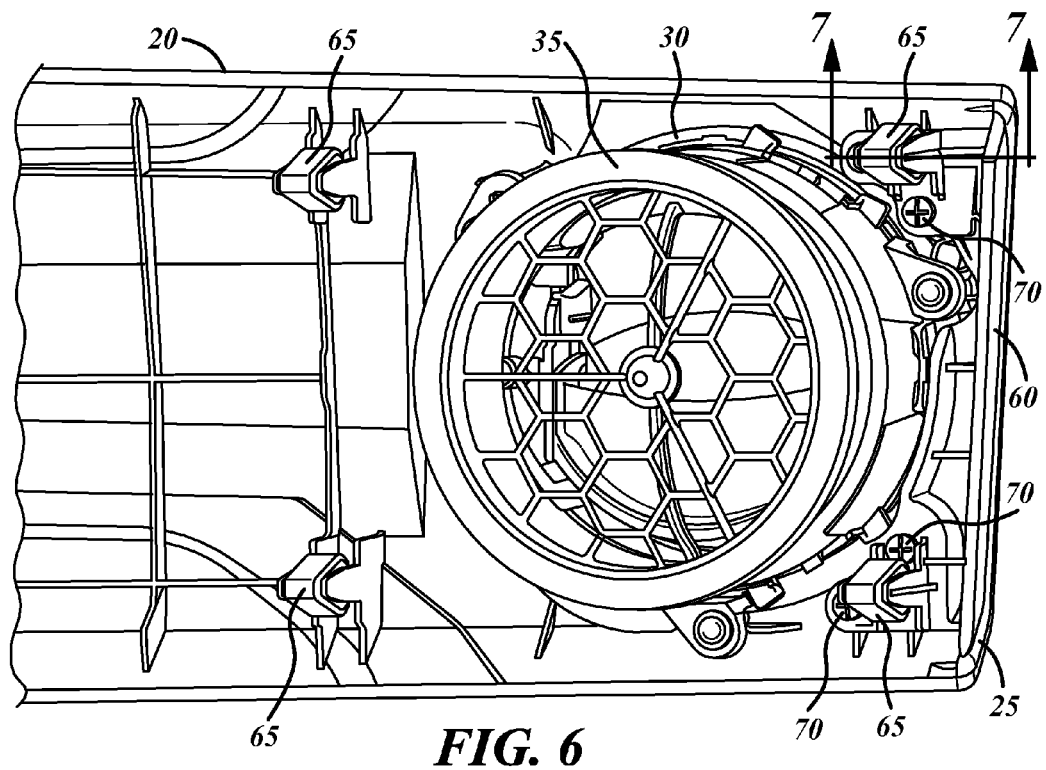
FIG. 6 is a perspective view of the back of the panel assembly with the side panel attached to the front panel.

The front panel 20 and/or the side panel 25 also include one or more clip members 65 (FIGS. 3, 6), the clip members 65 extending from the front panel 20 and/or the side panel 25 and are operable to attach the panel assembly 15 into the instrument panel 10 after the front panel 20 and side panel 25 are attached to each other with the fasteners 70. The clip members 65 can be made of a similar material as the front panel 20 and/or the side panel 25, and can be integrally molded with the front panel 20 and/or the side panel 25.

A method of assembling and installing the panel assembly 15 of the preferred embodiment into the instrument panel 10 is as follows.

The front panel 20 is provided along with the first flexible covering 75. The first flexible covering 75 is extended and installed along the front surface 40 of the front panel 20, the first flexible covering 75 wrapping around to the back surface 45 of the front panel 20.

The side panel 25 is also provided. The side panel 25 can be covered with the second flexible covering 80, the second flexible covering 80 can be extended and installed along the outside surface 60 of the side panel 25, the second flexible covering 80 wrapping from the outside surface 60 to the inside surface 50 of the side panel 25.

The front panel 20 and the side panel 25 having the first flexible covering 75 and the second flexible covering 80, respectively, are then attached to each other with the fasteners 70. The inside surface 50 of the side panel 25 and the back surface 45 of the front panel 20, in combination with the fasteners 70, provide the compression force to secure the first flexible covering 75 and the second flexible covering 80 in the joint area 85 between the front panel 20 and the side panel 25 as is known to one skilled in the art.

Finally, the panel assembly 15 having the front panel 20 with the first flexible covering 75 attached to the side panel 25 with the second flexible covering 80 is installed into the instrument panel 10. This installation is facilitated by the clip members 65 of the front panel 20 and/or the side panel 25.

It is understood and appreciated that the foregoing drawings, discussion, and description are illustrative of specific embodiments of the present invention, but they are not meant to be limitations upon the practice thereof. Numerous modifications and variations of the invention will be readily apparent to those of skill in the art in view of the teachings presented herein. It is the claims, including all equivalents, which define the scope of the invention.

The invention claimed is:

1. A panel assembly for an instrument panel in a motor vehicle, the panel assembly comprising:
   a front panel having an end portion extending generally normal from a distal end of the front panel, a front surface and a back surface;
   a side panel;
   a flexible covering extending along the front surface of the front panel, wrapping around to the back surface of the front panel;
   the front panel being attached to the side panel such that the end portion of the front panel abuts the side panel to form a joint between the front panel and the side panel;
   the flexible covering being compressed in the joint between the front panel and the side panel.

2. The panel assembly of claim 1 wherein the flexible covering is secured by a compression force provided by the attachment of the front panel to the side panel.

3. The panel assembly of claim 2 further comprising:
   the side panel including an outside surface and an inside surface
   a second flexible covering,
   the second flexible covering extending along the outside surface of the side panel, wrapping around to the inside surface of the side panel.

4. The panel assembly of claim 3 wherein the second flexible covering is secured by a compression force provided by the attachment of the front panel to the side panel.

5. The panel assembly of claim 1 further comprising:
   one or more clip members,
   the clip members extending from the side panel and operable to attach the panel assembly to the instrument panel.

6. The panel assembly of claim 1 further comprising:
one or more clip members,
the clip members extending from the front panel and operable to attach the panel assembly to the instrument panel.

7. The panel assembly of claim 1 further comprising:
a plurality of clip members,
the clip members extending from the side panel and the front panel, the clip members operable to attach the panel assembly to the instrument panel.

8. The panel assembly of claim 1 wherein the front panel includes a cut out portion.

9. A method for assembling a panel assembly and installing the assembly into an instrument panel of an automobile, the method comprising:
providing an instrument panel, a front panel, a side panel, and a flexible covering, the front panel having an end portion extending generally normal from a distal end of the front panel;
applying the flexible covering to the front panel;
attaching the side panel to the front panel after the flexible covering has been applied such that the end portion of the front panel abuts the side panel to form a joint between the front panel and the side panel, the flexible covering being compressed in the joint between the front panel and the side panel; and
attaching the side panel and the front panel to the instrument panel.

10. The method of claim 9 further comprising:
providing a second flexible covering;
applying the second flexible covering to the side panel before the side panel is attached to the front panel.

11. The panel assembly of claim 1 wherein the side panel includes an outside surface, the outside surface of the side panel being generally normal to the front surface of the front panel.

12. The panel assembly of claim 3 wherein the outside surface of the side panel is generally normal to the inside surface of the side panel.

13. The panel assembly of claim 12 wherein the end portion of the front panel abuts the inside surface of the side panel.

* * * * *